United States Patent
Love et al.

(10) Patent No.: US 9,798,521 B2
(45) Date of Patent: Oct. 24, 2017

(54) SYSTEM, METHOD AND APPARATUS FOR RANDOM NUMBER GENERATION

(71) Applicant: Schlage Lock Company LLC, Indianapolis, IN (US)

(72) Inventors: Devin Love, Carmel, IN (US); Raymond F. Rettig, Fishers, IN (US)

(73) Assignee: Schlage Lock Company LLC, Indianapolis, IN (US)

(*) Notice: Subject to any disclaimer, the term of this patent is extended or adjusted under 35 U.S.C. 154(b) by 206 days.

(21) Appl. No.: 14/835,069

(22) Filed: Aug. 25, 2015

(65) Prior Publication Data

US 2016/0062734 A1 Mar. 3, 2016

Related U.S. Application Data

(60) Provisional application No. 62/042,767, filed on Aug. 27, 2014.

(51) Int. Cl.
*G06F 7/58* (2006.01)

(52) U.S. Cl.
CPC .................... *G06F 7/588* (2013.01)

(58) Field of Classification Search
None
See application file for complete search history.

(56) References Cited

U.S. PATENT DOCUMENTS

| | | | | |
|---|---|---|---|---|
| 6,369,727 B1* | 4/2002 | Vincze | ............... | G06J 1/00 341/131 |
| 2004/0105541 A1* | 6/2004 | Elbe | ............... | G06F 7/72 380/28 |
| 2008/0040410 A1* | 2/2008 | Vartsky | ............... | B82Y 10/00 708/255 |
| 2014/0042948 A1* | 2/2014 | Green | ............... | H02P 27/04 318/503 |
| 2014/0070737 A1* | 3/2014 | Kloeker | ............... | H02P 1/22 318/283 |
| 2016/0062734 A1* | 3/2016 | Love | ............... | G06F 7/588 708/250 |

* cited by examiner

*Primary Examiner* — David H Malzahn
(74) *Attorney, Agent, or Firm* — Taft Stettinius & Hollister LLP

(57) ABSTRACT

A system, method and apparatus for generating random numbers. An electronic device operates an electric motor to drive a mechanical device. The electronic device includes a processing device structured to take one or more current measurements of the electric motor. The processing device is also structured to generate a seed and/or a random number based on at least one of the current measurements of the electric motor.

20 Claims, 4 Drawing Sheets

SYSTEM, METHOD AND APPARATUS FOR RANDOM NUMBER GENERATION

CROSS-REFERENCE TO RELATED APPLICATIONS

The present application claims the benefit of U.S. Provisional Application Ser. No. 62/042,767 filed on Aug. 27, 2014, the contents of which are incorporated herein by reference in their entirety.

BACKGROUND

The present application generally relates to a system, method and apparatus for generating random numbers.

Random numbers may be used in a variety of ways such as, for example, in the generation of encryption keys. Many embedded systems do not have a ready source of high entropy events to use for random number generation, and many external sources can be easily compromised. Entropy is the degree of disorder or uncertainty in a system. Random numbers may be generated in different ways using, for example, a pseudorandom number generator (PRNG) or a true random number generator (TRNG). Generally, a PRNG generates random numbers by using a mathematical formula or a pre-calculated or pre-determined list. A TRNG may rely upon a physical phenomenon to generate a random number. Some existing systems have various shortcomings relative to certain applications.

Accordingly, there remains a need for further contributions and developments in this area of technology.

SUMMARY

One embodiment of the present invention is generally directed to a unique system, method and apparatus for generating random numbers. Other embodiments include apparatuses, systems, devices, hardware, methods and combinations for generating random numbers. Further embodiments, forms, features, aspects, benefits and advantages of the present application shall become apparent from the description and figures provided herewith.

BRIEF DESCRIPTION OF THE DRAWINGS

The description herein makes reference to the accompanying figures wherein like reference numerals refer to like parts throughout the several views, and wherein.

DETAILED DESCRIPTION OF EXEMPLARY EMBODIMENTS

Figure 1:
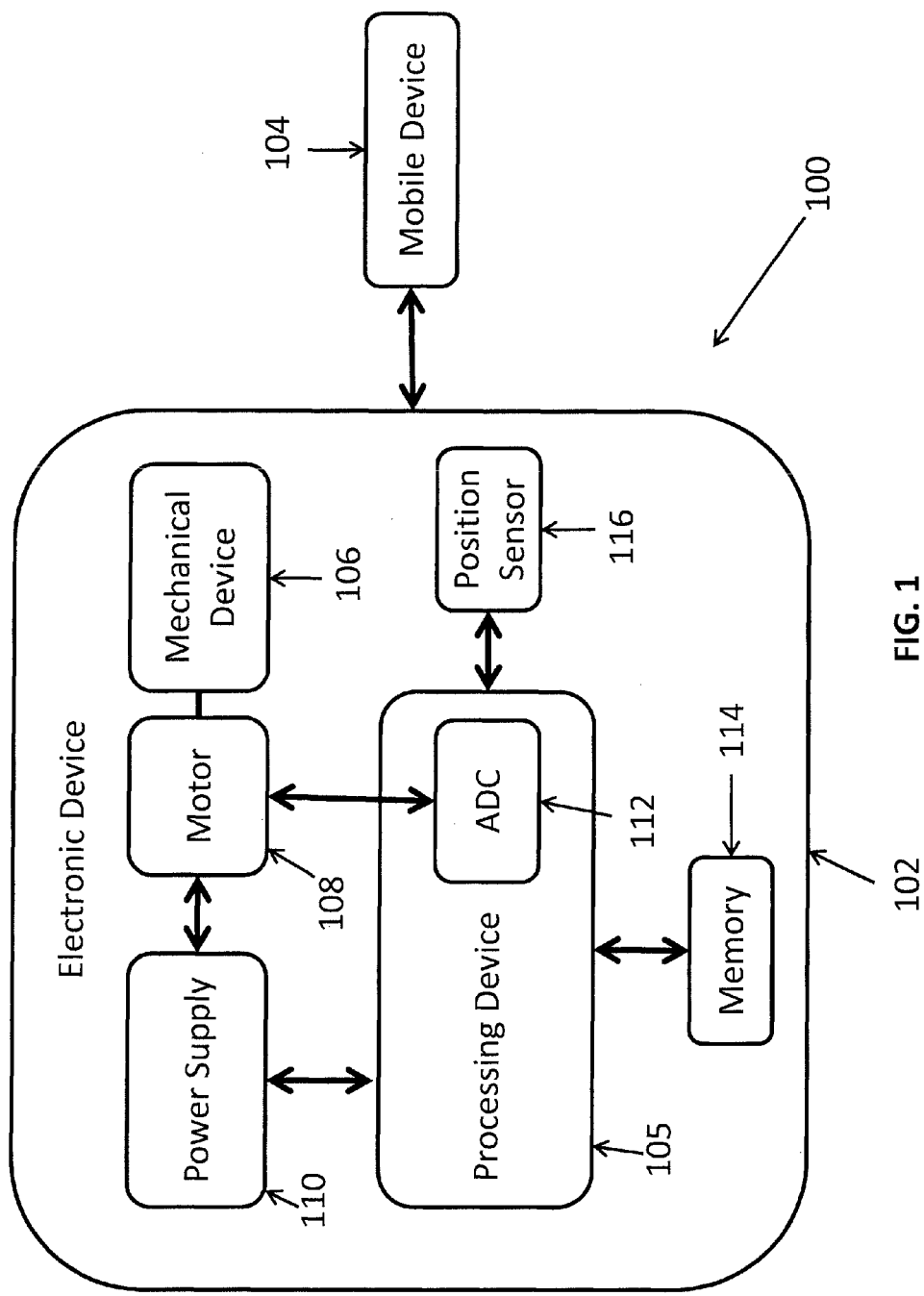
FIG. 1 is a schematic diagram of an exemplary system.

For the purposes of promoting an understanding of the principles of the invention, reference will now be made to the embodiments illustrated in the drawings and specific language will be used to describe the same. It will nevertheless be understood that no limitation of the scope of the invention is hereby intended. Any alterations and further modifications in the described embodiments, and any further applications of the principles of the invention as described herein are contemplated as would normally occur to one skilled in the art to which the invention relates.

FIG. 1 illustrates an exemplary system 100 including an electronic device 102 and a mobile device 104. The electronic device 102 may, for example, constitute an electronic lock including a processing device 105 that controls operation of the electronic device 102. The mobile device 104 may, for example, constitute a smartphone, a laptop computer, a tablet computer, or other types of mobile communication or computing devices.

The electronic device 102 includes a mechanical element 106 such as, for example, a deadbolt or latch in embodiments where the electronic device constitutes an electronic lock. In other embodiments, the electronic device 102 may constitute a door closer or other types of access control devices. The mechanical device 106 is driven or actuated by an electric motor or actuator 108. In other embodiments, the electric motor 108 may be part of a cooling fan in which the mechanical device 106 includes fan blades. Furthermore, in other embodiments, the electric motor 108 may be a generator such as, for example, if the electric motor 108 is run in reverse.

In the embodiment illustrated in FIG. 1, the electric motor 108 is a direct current (DC) motor. It is contemplated that in other embodiments, the electric motor 108 may be alternating current (AC) motor. The electronic device 102 also includes a power supply 110, such as a battery, that provides power to the processing device 105 and the electric motor 108.

The electronic device 102 may communicate with the mobile device 104 via a wireless connection, a wired connection, or both wireless and wired connections. For example, the electronic device 102 may communicate with the mobile device 104 via Bluetooth. However, other communication protocols are also contemplated in other embodiments. The electronic device 102 may generate one or more encryption keys for creating a secure communication channel between the electronic device 102 and the mobile device 104.

To generate an encryption key, the processing device 105 uses a random number. The random number is based on a source of randomness. The random number may be based, for example, on a seed that is used in a random number generation algorithm.

In the system 100, the processing device 105 measures the current draw of the electric motor 108 during its operation via an analog-to-digital converter (ADC) 112. The ADC 112 illustrated in FIG. 1 is part of the processing device 105. However, in other embodiments, the ADC 112 may be a separate device, or the current may be measured in a different manner. The ADC 112 converts the current measurement from an analog value to a digital value. The current measurement may be used as in the generation of a random number, or the current measurement may be used as a seed in the generation of a random number.

The current draw of the electric motor 108 is a source of physical randomness that is part of the digital computing system (i.e., the electronic device 102). The Gaussian noise of the electric motor 108 is relatively large, and the load on the electric motor 108 is not uniform or constant. The digital representation of the electric motor current has high entropy, and is typically more random than other electronic pseudorandom sources. The processing device 105 determines unpredictable high quality random numbers by measuring the current draw of the electric motor 108 when the electric motor 108 is active.

The current measurement, the seed, and/or the random number may be stored in a secure memory 114 such as, for example, EEPROM. In other embodiments, the secure memory 114 may be another type of memory (e.g., flash), or the secure memory 114 may be part of the processing device 105.

In some embodiments, only the least significant bits of the current measurement are used to create an aperiodic noise sampling rate. For example, FIG. 3 and its accompanying description describe this feature.

The electronic device 102 may also provide an anti-tamper mechanism by confirming the operation of the electric motor drive train while generating the high entropy event so that a predetermined known number cannot be injected into the system. The processing device 105 may take one or more measurements of the electric motor current and compare the current measurement(s) to a known motor current profile to determine if the mechanical device 106 successfully locked or unlocked, or in other embodiments to determine whether the mechanical device moved as expected. The known motor current profile includes one or more current thresholds tailored to the expected current draws when the electric motor 108 drives the mechanical device 108 properly.

In some embodiments, at least initially, the measured motor current values should fall below one or more thresholds. The processing device 105 will continue to take measurements, and after a specified number of iterations, the processing device 105 will look for a gradual sweeping increase in the measured current values that moves above the one or more aforementioned thresholds. Once this occurs, the processing device 105 will determine that the mechanical device 106 properly moved from the perspective of the ADC 112. For example, in the embodiment illustrated in FIG. 1, the processing device 105 will determine whether the deadbolt has moved from a locked position to an unlocked position, or from an unlocked position to a locked position. If the processing device 105 determines that the one or more current measurements do not match the known motor current profile, the current measurement(s) will be discarded (i.e., no seed or random number will be generated based on the measurement(s)).

The processing device 105 may also verify that the mechanical device 106 properly moved (e.g., from an extended position to a retracted position, or from a retracted position to an extended position) by analyzing the physical position of the mechanical device 106 via a position sensor or encoder 116. It is contemplated that in some embodiments, the position sensor 116 may be located outside of the electronic device 102. If the processing device 105 determines that the physical position of the mechanical device 106 is relatively close to the expected known position, then the processing device 105 will determine that the operation of the mechanical device 106 was proper. If the processing device 105 determines that the mechanical device 106 did not move to a known position, the current measurement(s) will be discarded (i.e., no seed or random number will be generated based on the measurement(s)).

The processing device 105 may perform these anti-tamper functions before using the random number measured in the motor current. This anti-tamper feature protects against security threats that may saturate the system to remove randomness from the current measurement. If the motor current measurement is tampered with, the electronic device 102 may enter a failed state mode and will not use the random number and/or seed until the electric motor 108 and the mechanical device 106 operate properly.

Although the electronic device 102 illustrated in the embodiment of FIG. 1 is an electronic lock, in other embodiments, the electronic device 102 could be any type of device that generates and utilizes random numbers during operation. For example, the electronic device 102 may generate random numbers for uses other than cryptographic key exchange such as the exchange of secured data. In addition, the electronic device 102 may include other parts, elements and components, the likes of which are not shown for clarity.

Figure 2:
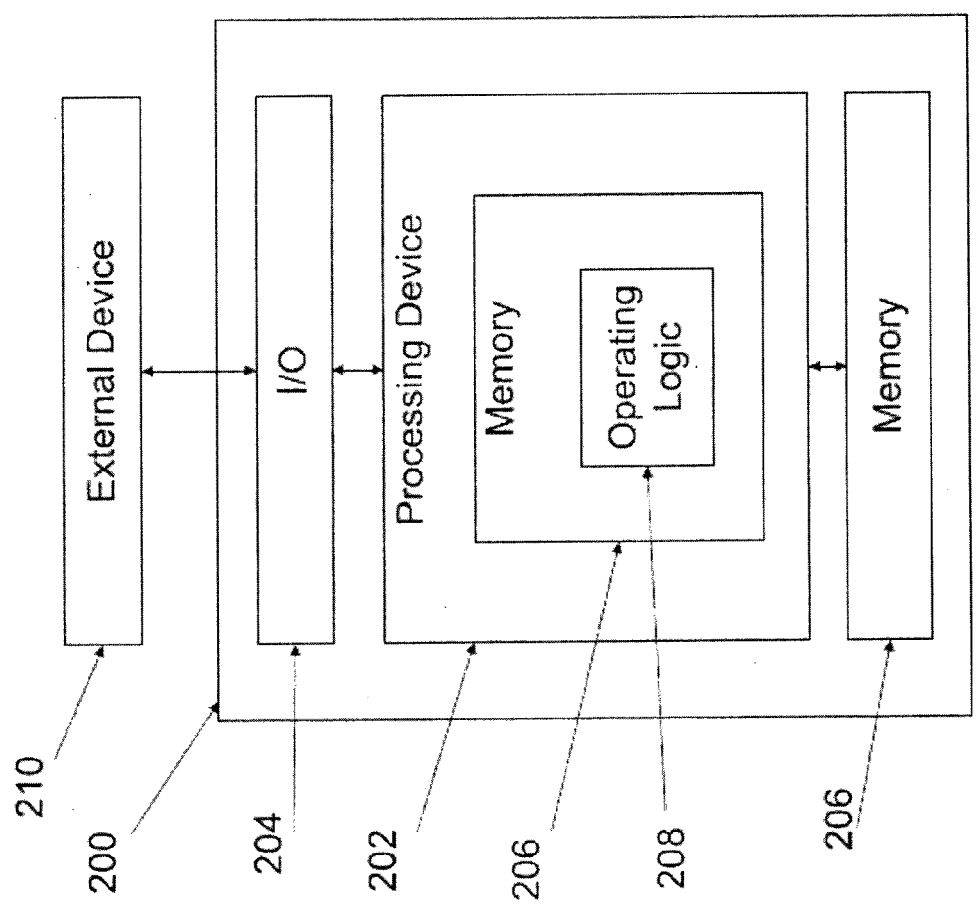
FIG. 2 is a schematic diagram of an exemplary computing device.

FIG. 2 illustrates a schematic block diagram of a computing device 200. The computing device 200 is one example of an electronic device or mobile device configuration that may be utilized in connection with the electronic device 102 or the mobile device 104 shown in FIG. 1. The computing device 200 includes a processing device 202, an input/output device 204, memory 206 and operating logic 208. Furthermore, computing device 200 communicates with one or more external devices 210.

The input/output device 204 allows the computing device 200 to communicate with the external device 210. For example, the input/output device 204 may be a transceiver, a network adapter, a network card, an interface, or a port (e.g., a USB port, serial port, parallel port, an analog port, a digital port, VGA, DVI, HDMI, FireWire, CAT 5, or any other type of port or interface). The input/output device 204 may include hardware, software and/or firmware. It is also contemplated that the input/output device 204 may include more than one of these adapters, cards or ports.

The external device 210 may be any type of device that allows data to be inputted or outputted from the computing device 200. For example, the external device 210 may be a mobile device, an electronic device, equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

The processing device 202 can be a programmable type, a dedicated, hardwired state machine, or any combination thereof. The processing device 202 may further include multiple processors, Arithmetic-Logic Units (ALUs), Central Processing Units (CPUs), Digital Signal Processors (DSPs), or the like. The processing devices 202 with multiple processing units may utilize distributed, pipelined, and/or parallel processing. The processing device 202 may be dedicated to the performance of just the operations described herein, or may be utilized in one or more additional applications. In the depicted embodiment, the processing device 202 is of a programmable variety that executes algorithms and processes data in accordance with operating logic 208 as defined by programming instructions (i.e., software or firmware) stored in memory 206. Alternatively or additionally, operating logic 208 for the processing device 202 is at least partially defined by hardwired logic or other hardware. The processing device 202 may include one or more components of any type suitable to process the signals received from the input/output device 204 or elsewhere, and to provide desired output signals. Such components may include digital circuitry, analog circuitry, or a combination of both.

The memory 206 may be of one or more types, such as a solid-state variety, electromagnetic variety, optical variety, or a combination of these forms. Furthermore, the memory 206 can be volatile, nonvolatile, or a combination of these types, and some or all of the memory 206 can be of a portable variety, such as a disk, tape, memory stick, cartridge, or the like. In addition, the memory 206 can store data that is manipulated by the operating logic 208 of the processing device 202 such as, for example, data representative of signals received from and/or sent to input/output device 204, in addition to or in lieu of storing programming instructions defining operating logic 208. As shown in FIG. 2, the memory 206 may be included with processing device 202 and/or coupled to the processing device 202.

Figure 3:
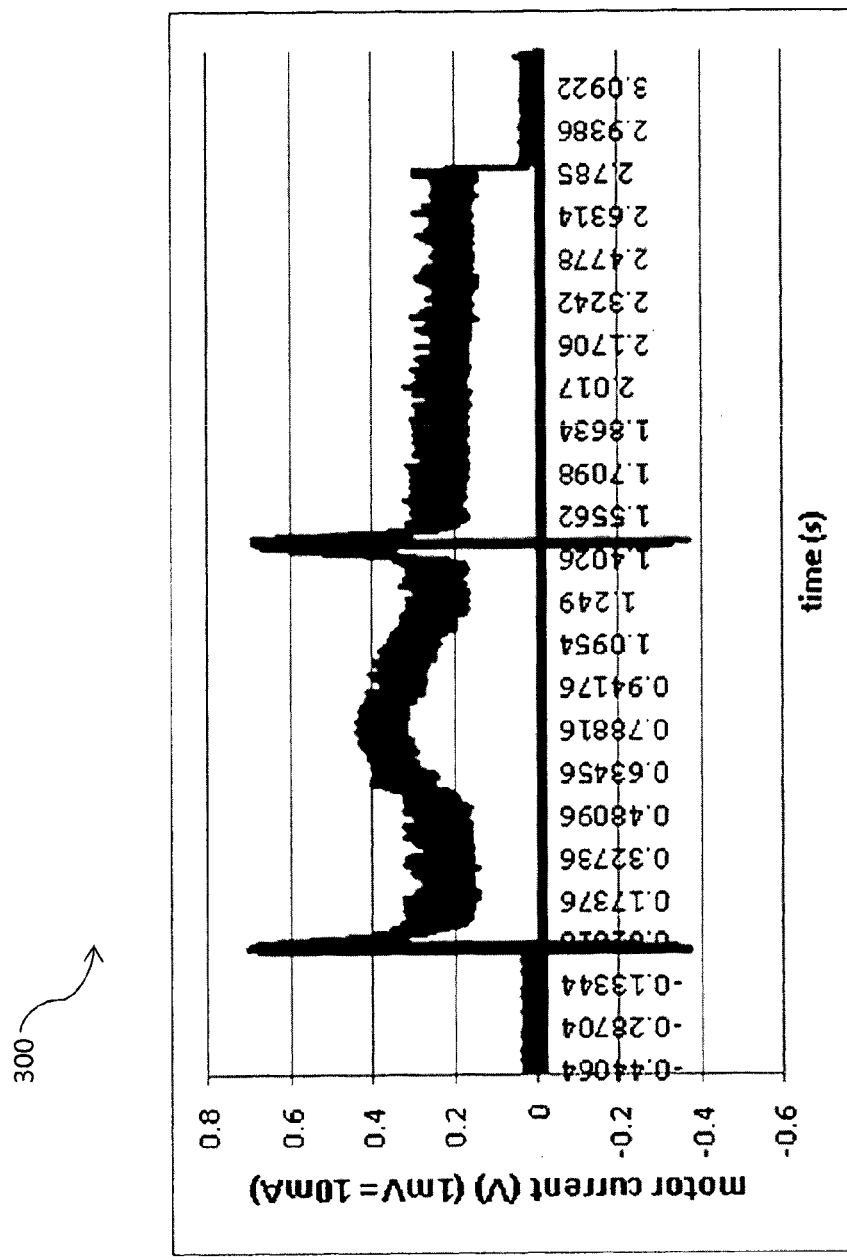
FIG. 3 is a graph of exemplary current measurements of a motor.

FIG. 3 illustrates a graph 300 of exemplary current measurements of an electric motor during a deadbolt locking event. The y-axis represents voltage and the x-axis represents time. The motor current is translated to voltage at the following ratio: 1 mV=10 mA. The motor current noise is approximately 180 mV peak-to-peak. The graph 300 illustrates one example of motor current (translated to voltage) that varies over time during operation. The various peak and valleys in the graph may be used to construct the one or more thresholds for the anti-tamper feature.

As discussed above, the random number and/or the seed may be based on the least significant bits of the current measurement such as, for example, the last four least significant bits of the current measurement. Illustrated below is a table of a sample of 53 current measurements, and the sample variance and mean of the last four least significant bits. It should be understood that this data is exemplary, and that other data sets or measurements are also contemplated. The current measurements may vary in different embodiments. The highest of these four least significant bits represents 2.4 mV resolution of the motor current. The mean and variance was calculated for the exemplary sample. A true uniform distribution (highest entropy) would have a calculated mean of 7.5 and a variance of 18.75. As more samples are taken, it is expected that the noise measurements will approach the mean and variance of a uniform distribution.

| Binary Current Measurement | Last Four LSBs | Decimal Representation |
|---|---|---|
| 1000101 | 0101 | 5 |
| 1001011 | 1011 | 11 |
| 1001110 | 1110 | 14 |
| 1001101 | 1101 | 13 |
| 1001110 | 1110 | 14 |
| 1001111 | 1111 | 15 |
| 1001101 | 1101 | 13 |
| 1001100 | 1100 | 12 |
| 1010001 | 0001 | 1 |
| 1010101 | 0101 | 5 |
| 1001100 | 1100 | 12 |
| 1001001 | 1001 | 9 |
| 1001001 | 1001 | 9 |
| 1010000 | 0000 | 0 |
| 1010111 | 0111 | 7 |
| 1011111 | 1111 | 15 |
| 1011000 | 1000 | 8 |
| 1010011 | 0011 | 3 |
| 1011001 | 1001 | 9 |
| 1010001 | 0001 | 1 |
| 1010000 | 0000 | 0 |
| 1010010 | 0010 | 2 |
| 1010111 | 0111 | 7 |
| 1010010 | 0010 | 2 |
| 1010110 | 0110 | 6 |
| 1100010 | 0010 | 2 |
| 1011110 | 1110 | 14 |
| 1011111 | 1111 | 15 |
| 1100101 | 0101 | 5 |
| 1101000 | 1000 | 8 |
| 1101001 | 1001 | 9 |
| 1100110 | 0110 | 6 |
| 1101000 | 1000 | 8 |
| 0111010 | 1010 | 10 |
| 1000011 | 0011 | 3 |
| 0111110 | 1110 | 14 |
| 0111111 | 1111 | 15 |
| 1001011 | 1011 | 11 |
| 1000100 | 0100 | 4 |
| 1000101 | 0101 | 5 |
| 1001011 | 1011 | 11 |
| 1001011 | 1011 | 11 |
| 1001001 | 1001 | 9 |
| 1001000 | 1000 | 8 |
| 1000011 | 0011 | 3 |
| 1000100 | 0100 | 4 |
| 1000111 | 0111 | 7 |
| 1000011 | 0011 | 3 |
| 1000010 | 0010 | 2 |
| 1001001 | 1001 | 9 |
| 0100001 | 0001 | 1 |
| Sample Variance | | 21.19294118 |
| Sample Mean | | 7.6471 |

Figure 4:
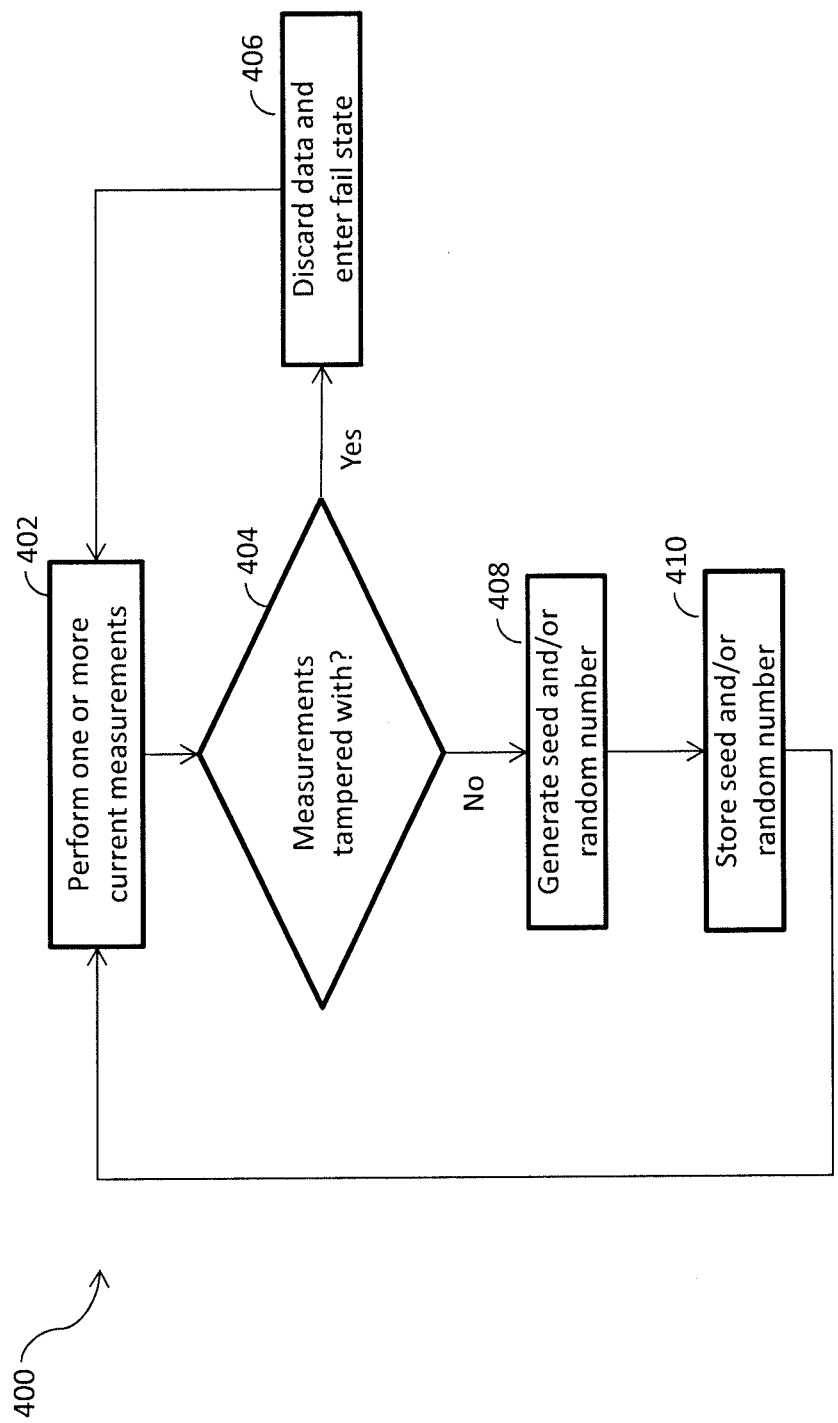
FIG. 4 is a flow diagram of an exemplary process for generating a random number.

FIG. 4 illustrates a schematic flow diagram of an exemplary process 400 for generating a random number. Operations illustrated for all of the processes in the present application are understood to be exemplary only, and operations may be combined or divided, and added or removed, as well as re-ordered in whole or in part, unless explicitly stated to the contrary.

Process 400 begins at operation 402 in which the processing device 105 may take one or more current measurements of the electric motor 108 via the ADC 112.

Process 400 then proceeds from operation 402 to operation 404. At operation 404 the processing device 105 may determine whether the one or more current measurements have been tampered with. In particular, the processing device 105 may compare the one or more current measurements to a known motor current profile, as discussed above. The processing device 105 may also compare the position of the mechanical device 106 via the position sensor 116 to an expected or known position. If the processing device 105 determines that the one or more current measurements have been tampered with, process 400 proceeds to operation 406. At operation 406 the electronic device 102 may enter a failed state mode in which the current measurements, the seed, and/or a random number may be discarded. Process 400 then proceeds from operation 406 to operation 402.

If the processing device 105 determines that the one or more current measurements have not been tampered with, process 400 proceeds to operation 408. At operation 408, the processing device generates a seed and/or a random number, as discussed above.

Process 400 then proceeds from operation 408 to operation 410. At operation 410 the processing device 105 stores the seed and/or the random number in memory. Process 400 then proceeds from operation 410 to operation 402.

While the invention has been described in connection with what is presently considered to be the preferred embodiment, it is to be understood that the invention is not to be limited to the disclosed embodiment(s), but on the contrary, is intended to cover various modifications and equivalent arrangements. Further, when the language "at least a portion" and/or "a portion" is used the item may include a portion and/or the entire item unless specifically stated to the contrary.

What is claimed is:

1. A method, comprising:
operating an electric motor to drive a mechanical device;
determining, with a processing device, one or more current measurements of the electric motor; and
generating, with the processing device, a random number based on at least one of the one or more current measurements.

2. The method of claim 1, further comprising:
storing the random number in a secure memory.

3. The method of claim 1, further comprising:
calculating, with the processing device, a seed based on at least one of the one or more current measurements; and
wherein the generating the random number is further based on the seed.

4. The method of claim 3, further comprising:
storing the seed in a secure memory.

5. The method of claim 3, wherein the seed is based on four least significant bits of one of the one or more current measurements.

6. The method of claim 1, wherein the random number is based on four least significant bits of one of the one or more current measurements.

7. The method of claim 1, further comprising:
after determining the one or more current measurements, determining, with the processing device, whether the one or more current measurements have been tampered with.

8. The method of claim 7, wherein the determining whether the one or more current measurements have been tampered with includes comparing the one or more current measurements to one or more known current measurements in a current measurement profile.

9. The method of claim 7, wherein the determining whether the one or more current measurements have been tampered with includes sensing whether the mechanical device moved to a known position based on an output of a position sensor.

10. The method of claim 7, further comprising:
discarding the one or more current measurements if the one or more current measurements have been tampered with.

11. The method of claim 1, further comprising:
generating, with the processing device, an encryption key based on the random number.

12. The method of claim 1, wherein the mechanical device is one of a deadbolt lock mechanism and a latch mechanism.

13. An apparatus, comprising:
a mechanical device;
an electric motor to drive the mechanical device;
a processing device structured to take a current measurement of the electric motor as the electric motor drives the mechanical device, wherein the processing device is further structured to generate a random number based on the current measurement; and
a secure memory to store the random number.

14. The apparatus of claim 13, wherein the motor is a DC motor.

15. The apparatus of claim 13, wherein the apparatus is an electronic lock device.

16. The apparatus of claim 13, wherein the processing device is further structured to evaluate whether the current measurement has been tampered with.

17. The apparatus of claim 13, wherein the processing device is further structured to create an encryption key based on the random number.

18. The apparatus of claim 13, wherein the mechanical device is one of a deadbolt lock mechanism and a latch mechanism.

19. A method, comprising:
operating an electric motor to drive a mechanical device;
evaluating, with a processing device, one or more current measurements of the electric motor;
determining, with the processing device, whether the one or more current measurements have been tampered with;
generating, with the processing device, a random number based on at least one of the one or more current measurements; and
storing the random number in a secure memory.

20. The method of claim 19, wherein the mechanical device is one of a deadbolt lock mechanism and a latch mechanism.

* * * * *